United States Patent
Saboune et al.

(10) Patent No.: US 10,360,775 B1
(45) Date of Patent: Jul. 23, 2019

(54) SYSTEMS AND METHODS FOR DESIGNING HAPTICS USING SPEECH COMMANDS

(71) Applicant: Immersion Corporation, San Jose, CA (US)

(72) Inventors: Jamal Saboune, Montreal (CA); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 16/004,510

(22) Filed: Jun. 11, 2018

(51) Int. Cl.
  *G06Q 10/10* (2012.01)
  *G08B 6/00* (2006.01)
  *G10L 15/22* (2006.01)

(52) U.S. Cl.
  CPC .............. *G08B 6/00* (2013.01); *G10L 15/22* (2013.01); *G10L 2015/223* (2013.01)

(58) Field of Classification Search
  None
  See application file for complete search history.

(56) References Cited

U.S. PATENT DOCUMENTS

| | | | |
|---|---|---|---|
| 9,576,445 B2 | 2/2017 | Cruz-Hernandez | |
| 9,619,980 B2 | 4/2017 | Cruz-Hernandez | |
| 9,652,945 B2 | 5/2017 | Levesque | |
| 9,711,014 B2 | 7/2017 | Cruz-Hernandez | |
| 2006/0038781 A1* | 2/2006 | Levin | G06F 3/016 345/163 |
| 2013/0227411 A1* | 8/2013 | Das | H04M 3/42042 715/702 |
| 2014/0330607 A1* | 11/2014 | Zhang | G06Q 10/1093 705/7.18 |
| 2016/0334871 A1* | 11/2016 | Levesque | G06F 3/016 |
| 2017/0199046 A1* | 7/2017 | Lee | G01C 21/3415 |

* cited by examiner

*Primary Examiner* — Brent Swarthout
(74) *Attorney, Agent, or Firm* — Kilpatrick Townsend and Stockton LLP

(57) ABSTRACT

Systems and methods for designing haptics using speech commands are disclosed. One illustrative system described herein includes: a processor configured to: receive an audio signal from an audio capture device, the audio signal associated with vocal user interaction; determine a haptic effect based in part on the audio signal, the haptic effect configured to be output by a haptic output device; and store the haptic effect on a data store.

20 Claims, 5 Drawing Sheets

SYSTEMS AND METHODS FOR DESIGNING HAPTICS USING SPEECH COMMANDS

FIELD OF THE INVENTION

This application relates to designing haptic effects, and more particularly to systems and methods for designing haptic effects using speech commands.

BACKGROUND

Haptic-enabled devices have become increasingly popular as are haptic-enabled environments. For instance, mobile and other devices may be configured with touch-sensitive surfaces so that a user can provide input by touching portions of the touch-sensitive display. Alternatively, gesture input and other input for haptic enabled devices or environments are also becoming popular for wearables, VR or AR devices, automotive, gaming, live events, group events and other environments. Similarly, systems and methods for voice recognition and control of electronic devices are becoming more common. There is therefore a need for additional systems for designing haptic effects.

SUMMARY

In one embodiment, a system according to the present disclosure comprises: a processor configured to: receive an audio signal from an audio capture device, the audio signal associated with vocal user interaction; determine a haptic effect based in part on the audio signal, the haptic effect configured to be output by a haptic output device; and store the haptic effect on a data store.

In another embodiment, a method according to the present disclosure comprises: receiving an audio signal from an audio capture device, the audio signal associated with vocal user interaction; determining a haptic effect based in part on the audio signal, the haptic effect configured to be output by a haptic output device; and storing the haptic effect on a data store In yet another embodiment, a non-transitory computer readable medium may comprise program code, which when executed by a processor is configured to cause the processor to: receive an audio signal from an audio capture device, the audio signal associated with vocal user interaction; determine a haptic effect based in part on the audio signal, the haptic effect configured to be output by a haptic output device; and store the haptic effect on a data store.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1A:
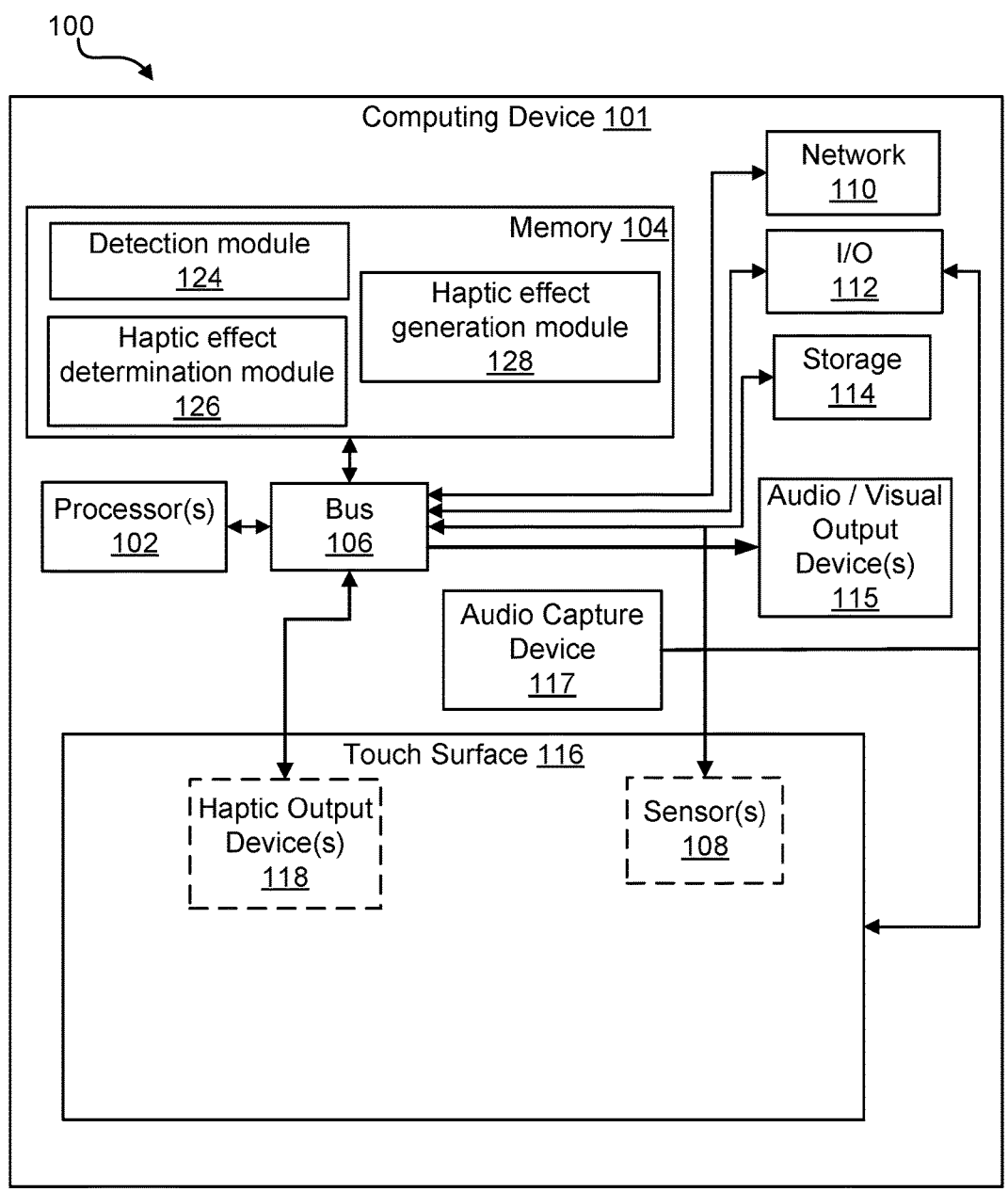
FIG. 1A shows an illustrative system for designing haptic effects using speech commands according to one embodiment of the present disclosure.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of a System for Designing Haptic Effects Using Speech Commands One illustrative embodiment of the present disclosure comprises an electronic device, such as a tablet, e-reader, mobile phone, or computer such as a laptop or desktop computer, wearable device, or interface for Virtual Reality (VR) or Augmented Reality (AR). The electronic device comprises a display (such as a touch-screen display), a memory, and a processor in communication with each of these elements. In the illustrative embodiment, the electronic device comprises a haptic output device configured to output haptic effects. Further, the illustrative electronic device may be configured to receive user interaction with conventional interface devices, e.g., one or more of a touchscreen, mouse, joystick, multifunction controller, etc.

In the illustrative embodiment the electronic device is further configured to receive vocal user interaction, e.g., via a microphone. The electronic device further comprises a processor programmed to process audio received from the microphone and determine information associated with the vocal user interaction. For example, the illustrative electronic device may comprise programming to understand spoken words, e.g., Automatic Speech Recognition (ASR) techniques or speech-to-text, such as Hidden Markov Model (HMM), Gaussian Mixture Model (GMM), Deep Learning etc. In the illustrative embodiment the electronic device is further configured to determine a haptic effect based on the vocal user interaction.

In the illustrative embodiment, the vocal user interaction may comprise any man-made sound. In one embodiment, the vocal user interaction comprises speech describing the desired haptic effect. For example, the speech may comprise description of characteristics of a haptic effect, e.g., speech describing a desired waveform, such as one or more of: a wave shape, a frequency, an intensity, a type, or a duration. The illustrative electronic device may use this vocal user interaction to generate a haptic signal that will match the desired characteristics. Further in the illustrative embodiment the vocal user interaction may comprise a description of a concept associated with the desired haptic effect, e.g., impact, explosion, or rain. In such an embodiment, the electronic device will determine a haptic effect with characteristics to simulate that concept. In yet another example, the vocal user interaction may comprise a sound that mimics the desired haptic effect. In such an embodiment, the electronic device will determine a haptic effect that is associated with the sound.

In some embodiments, the audible interaction may comprise a mix of the embodiments described above. For example, a user may describe an effect by saying: "provide an explosion effect with a BOOM of 200 ms at full magnitude and a 50 Hz frequency." In such an embodiment, the electronic device will determine a haptic effect that matches the description provided by the user.

In the illustrative embodiment, the electronic device may comprise software to generate new waveforms associated with haptic effects. Further, the electronic device may be configured to modify a pre-existing haptic effect. For example, the user may describe a rain effect with a higher frequency, and the electronic device may increase the frequency of the haptic effect associated with rain, e.g., by increasing the frequency and/or amplitude of the haptic signal. The electronic device may be configured to search a remote or local database of haptic effects to identify an effect with the desired characteristics. Alternatively, in some embodiments, the database may comprise audio and/or video files that the system may compare to audio and/or visual input to determine similarities, and thus select a haptic effect based on similarities between the input and the file.

In the illustrative embodiment, the electronic device is configured to receive a pre-existing haptic signal and modify that haptic signal to match the desired effects. For example, the electronic device may search a database to locate haptic effects. This database may comprise a large number of haptic effects organized by tags. The processor may be configured to extract tags associated with the determined speech, e.g., tags associated with specific words, and locate haptic effects that match the tags in the determined speech. For example, the user may describe a haptic effect associated with rain, and the electronic device may search a database of haptic effects for a haptic effect with a tag associated with rain.

In some embodiments, the electronic device may be further configured to enable the user to store haptic effects in a database. For example, when the user creates a new haptic effect or modifies an existing haptic effect, the user can then save that haptic effect to the database. Further, the user may be able to create tags associate with the database, e.g., tags such as "explosion," car wreck," "wrecking ball," etc. These haptic effects may be associated with events for use in a software application, e.g., an audio application, video application, gaming application, and/or application for VR or AR. Further, the user may be able to enhance the database by creating new tags for existing haptic effects. For example, when the user experiences a haptic effect, the user may be able to create a new tag associated with the haptic effect. This new tag may be descriptive of the haptic effect, e.g., "hard collision," "breaking glass bottles," etc., to enable the database to be searched more easily and efficiently. Further, in some embodiments, the user may be able to apply tags to video and/or audio segments with associated haptic effects to further enhance the searchability of the database.

In the illustrative embodiment, once the haptic effect is determined it may be stored in a memory, e.g., a local or remote data store. Alternatively or additionally, the electronic device may output the haptic effect via a haptic output device. In some embodiments the haptic effect may be output along with audio and/or video effects. These effects may enhance realism of an AR or VR experience, or be output along with an audio or video effect. Further, in the illustrative embodiment, a user may be given the option to confirm that the electronic device generated the desired haptic effect. In the illustrative embodiment, the haptic effect may not be stored unless the user provides this confirmation.

This illustrative example is given to introduce the reader to the general subject matter discussed herein and the disclosure is not limited to this example. The following sections describe various additional non-limiting examples of the present disclosure.

Illustrative Systems for Designing Haptic Effects Using Speech Commands

FIG. 1A shows an illustrative system 100 for designing haptic effects using speech commands. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device 101. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate connection to devices such as one or more displays, headsets comprising displays (e.g., for VR or AR), curved displays (e.g., the display includes angled surfaces extended onto one or more sides of computing device 101 on which images may be displayed), keyboards, mice, speakers, microphones, cameras (e.g., a front and/or a rear facing camera on a mobile device) and/or other hardware used to input data or output data. Storage 114 represents nonvolatile storage such as magnetic, optical, or other storage media included in device 101.

Audio/visual output device(s) 115 comprise one or more devices configured to receive signals from processor(s) 102 and provide audio or visual output to the user. For example, in some embodiments, audio/visual output device(s) 115 may comprise a display such as a touch-screen display, LCD display, plasma display, CRT display, projection display, a headset comprising a display for each eye (e.g., for use in VR or AR), or some other display known in the art. Further, audio/visual output devices may comprise one or more speakers configured to output audio to a user.

System 100 further includes a touch surface 116, which, in this example, is integrated into device 101. Touch surface 116 represents any surface that is configured to sense touch input of a user. In some embodiments, touch surface 116 may be configured to detect additional information associated with the touch input, e.g., the pressure, speed of movement, acceleration of movement, temperature of the user's skin, or some other information associated with the touch input. One or more sensors 108 may be configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position.

Further, in some embodiments, touch surface 116 and/or sensor(s) 108 may comprise a sensor that detects user interaction without relying on a touch sensor. For example, in one embodiment, the sensor may comprise a sensor configured to use electromyography (EMG) signals to detect pressure applied by a user on a surface. Further, in some embodiments, the sensor may comprise RGB or thermal cameras and use images captured by these cameras to estimate an amount of pressure the user is exerting on a surface.

In some embodiments, sensor 108 and touch surface 116 may comprise a touch-screen display or a touch-pad. For example, in some embodiments, touch surface 116 and sensor 108 may comprise a touch-screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor is in communication with a single sensor 108, in other embodiments, the processor is in communication with a plurality of sensors 108, for example, a first touch screen and a second touch screen.

In some embodiments one or more sensor(s) 108 further comprise one or more sensors configured to detect movement of the mobile device (e.g., accelerometers, gyroscopes, cameras, GPS, or other sensors). These sensors may be configured to detect user interaction that moves the device in the X, Y, or Z plane. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal. Further, in some embodiments, the user interaction comprises a multi-dimensional user interaction away from the device. For example, in some embodiments a camera associated with the device may be configured to detect user movements, e.g., hand, finger, body, head, eye, or feet motions or interactions with another person or object.

The computing device further comprises an audio capture device 117. Audio capture device 117 comprises one or more components configured to detect vocal user interaction and transmit signals associated with the vocal user interaction to processor(s) 102. In some embodiments, audio capture device 117 may comprise one or more microphones, e.g., audio capture device 117 may comprise one or more of: a dynamic microphone, a condenser microphone, a piezoelectric microphone, a MEMS (MicroElectrical-Mechanical System) microphone, a laser microphone, or a fiber optic microphone. Further, in some embodiments, audio capture device 117 and an audio output device may be incorporated into a single component.

In this example, a haptic output device 118 in communication with processor 102 is coupled to touch surface 116. In some embodiments, haptic output device 118 is configured, in response to a haptic signal, to output a haptic effect simulating a compliance of the touch surface. Additionally or alternatively, haptic output device 118 may provide vibrotactile haptic effects that move the touch surface in a controlled manner. Some haptic effects may utilize an actuator coupled to a housing of the device, and some haptic effects may use multiple actuators in sequence and/or in concert. For example, in some embodiments, a surface texture may be simulated by vibrating the surface at different frequencies. In such an embodiment haptic output device 118 may comprise one or more of, for example, a piezoelectric actuator, an electric motor, an electro-magnetic actuator, a voice coil, a shape memory alloy, an electroactive polymer, a solenoid, an eccentric rotating mass motor (ERM), or a linear resonant actuator (LRA). In some embodiments, haptic output device 118 may comprise a plurality of actuators, for example an ERM and an LRA. In still other embodiments, the haptic output device 118 may use non-actuated haptics (e.g., air, fluid, or ultrasonic output) that provide resistance as a means to convey rougher surfaces.

In some embodiments, the haptic effect may be modulated based on other sensed information about user interaction, e.g., relative position of hands in a virtual environment, object position in a VR/AR environment, object deformation, relative object interaction in a GUI, UI, AR, VR, etc. In still other embodiments, methods to create the haptic effects include the variation of an effect of short duration where the magnitude of the effect varies as a function of a sensed signal value (e.g., a signal value associated with user interaction). In some embodiments, when the frequency of the effect can be varied, a fixed perceived magnitude can be selected and the frequency of the effect can be varied as a function of the sensed signal value.

Although a single haptic output device 118 is shown here, embodiments may use multiple haptic output devices of the same or different type to output haptic effects. For example, in one embodiment, a piezoelectric actuator may be used to displace some or all of touch surface 116 vertically and/or horizontally at ultrasonic frequencies, such as by using an actuator moving at frequencies greater than 20-25 kHz in some embodiments. In some embodiments, multiple actuators such as eccentric rotating mass motors and linear resonant actuators can be used alone or in concert to provide different textures and other haptic effects.

In still other embodiments, haptic output device 118 may use electrostatic force, for example, by use of an electrostatic surface actuator, to simulate a texture on the surface of touch surface 116. Similarly, in some embodiments, haptic output device 118 may use electrostatic force to vary the friction the user feels on the surface of touch surface 116. For example, in one embodiment, haptic output device 118 may comprise an electrostatic display or any other device that applies voltages and currents instead of mechanical motion to generate a haptic effect. In such an embodiment, an electrostatic actuator may comprise a conducting layer and an insulating layer. In such an embodiment, the conducting layer may be any semiconductor or other conductive material, such as copper, aluminum, gold, or silver. And the insulating layer may be glass, plastic, polymer, or any other insulating material.

The processor 102 may operate the electrostatic actuator by applying an electric signal to the conducting layer. The electric signal may be an AC signal that, in some embodiments, capacitively couples the conducting layer with an object near or touching touch surface 116. In some embodiments, the AC signal may be generated by a high-voltage amplifier. In other embodiments the capacitive coupling may simulate a friction coefficient or texture on the surface of the touch surface 116. For example, in one embodiment, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116 or vary the coefficient of friction felt as the object moves across the surface of touch surface 116. Furthermore, in some embodiments, an electrostatic actuator may be used in conjunction with traditional actuators to vary the simulated texture on the surface of touch surface 116. For example, the actuators may vibrate to simulate a change in the texture of the surface of touch surface 116, while at the same time, an electrostatic actuator may simulate a different texture, or other effects, on the surface of touch surface 116 or on another part of the computing device 101 (e.g., its housing or another input device).

In some embodiments, an electrostatic actuator may be used to generate a haptic effect by stimulating parts of the body near or in contact with the touch surface 116. For example, in some embodiments, an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches the touch surface 116 and moves his or her finger on the touch surface, the user may sense a texture of prickliness, graininess, bumpiness, roughness, stickiness, or some other texture.

Turning to memory 104, exemplary program components 124, 126, and 128 are depicted to illustrate how a device can be configured in some embodiments to design haptic effects using speech commands. In this example, a detection module 124 configures processor 102 to monitor signals received from audio capture device 117 to determine if vocal user interaction has been received. For example, module 124 may sample audio capture device 117 to determine the presence or absence of vocal user interaction, e.g., speech describing a haptic effect. Further, in some embodiments, detection module 124 may further monitor input from sensor(s) 108, which may represent interaction on a graphical user interface to activate monitoring for an vocal user interaction. Further, in some embodiments, detection module 124 may monitor input from audio capture device 117 to determine the presence of a trigger word to begin monitoring for speech describing haptic effects. For example, in one embodiment, such a trigger word may comprise a phrase such as: "create haptic effect."

Detection element 124 may comprise programming to understand spoken words in the audible effect, e.g., Automatic Speech Recognition (ASR) techniques or speech-to-text, such as Hidden Markov Model (HMM), Gaussian Mixture Model (GMM), Deep Learning etc. Further, in another embodiment, rather than extracting full words, the detection element 124 may instead be configured to extract only features of the audible input, e.g., low level audio features, Mel-Frequency Cepstrum (MFC), mel-frequency analysis, Zero-Crossing Rate (ZCR), etc. and/or high level features extracted using a pre-trained deep learning network (VGGish, AlexNet, LSTM, RNN, etc.). Detection element 124 may further comprise functionality to apply tags to text to enable database searching. For example, tags may be applied to specific known words, e.g., words associated with haptic effects, such as "frequency" or with types of effects, e.g., "explosion."

In some embodiments, database and computing device 101 may comprise functionality to enable the user to store haptic effects. Further, the user may enhance the database by applying new tags to haptic effects to enable faster and more efficient searching. For example, in one embodiment, when the user experiences a haptic effect, the user may be able to create a new tag associated with the haptic effect. This new tag may be descriptive of the haptic effect, e.g., "50 Hz square wave with hard bang," "space shuttle liftoff," etc., to enable the database to be searched more easily and efficiently. Further, in some embodiments, the user may be able to apply tags to video and/or audio segments with associated haptic effects to further enhance the searchability of the database.

In yet another embodiment the haptic effect can be related to a content (Audio and/or Video) and the content itself may be tagged with keywords. In yet another embodiment the system can use a pre-trained machine learning model to associate tags/labels with haptic effects and audio content. For example, in such an embodiment, the database or a computing system associated with the database may automatically tag haptic effects, images, videos, or audio files by comparing features associated with the haptic effects, images, videos, or audio files to other haptic effects, images, videos, or audio files with tagged effects. Further, in some embodiments, the relationship between effects may be associated with a single object, e.g., "trains," "airplanes," "explosions," etc. Alternatively, tags may comprise characteristics of the effect (e.g. "sharp and short haptic effect," "muddy moderate effect"). Further, in the case of more discrete characteristics, e.g., "30 HZ at 20% magnitude," the tagging can also be applied using simple heuristic methods.

Haptic effect determination module 126 represents a program component that analyzes audio data received from audio capture device 117 to select a haptic effect to generate. For example, in one embodiment, module 126 comprises code that determines, based on the audible interaction, a haptic effect to generate. For example, module 126 may comprise program code configured to determine one or more of: a frequency, amplitude, wave-type, duty cycle, a grain size, grain density, max grain per cycle, and/or grain magnitude for a haptic signal, based in part on audible interaction. Alternatively, in some embodiments, haptic effect determination module 126 may comprise one or more pre-loaded haptic effects, e.g., haptic effects associated with particular objects in a VR or AR environment. These haptic effects may comprise any type of haptic effect that haptic output device(s) 118 are capable of generating.

In some embodiments, haptic effect determine module 126 comprises, or has access to, a database of predetermined haptic effects, or code to access a local or remote database of predetermined haptic effects. In such an embodiment, haptic effect determination module 126 may be configured to search the database for haptic effects matching a desired characteristic of the haptic effect. The database of haptic effects may comprise tagged keywords which makes associating effects to objects and actions easy. These keywords may match the keywords described above with regard to determination module 124, thus enabling easier database searching. For example, the determination module 126 may search the database for haptic effects that match tags determined by determination module 124. In such an embodiment, if many tags are identified, the haptic effect determination module 126 may search for haptic effects having a larger number of the tags. Further, the haptic effect determination module 126 may identify haptic effects with at least one matching tag, but prioritize haptic effects with a larger number of the tags. For example, in some embodiments, the system may determine the distance between features by calculating a distance vector between features. In some embodiments, these distance vectors can be estimated as an Euclidean or Mahalanobis distance. In other embodiments, input features may classified against the DB elements features (e.g., using KNN, SVM etc.).

Further, in some embodiments, module 126 may comprise program code configured to manipulate characteristics of a haptic effect, e.g., the effect's intensity, frequency, duration, duty cycle, or any other characteristic associated with a haptic effect. In some embodiments, module 126 may comprise program code to allow the user to manipulate these characteristics, e.g., via audible interaction from audio capture device 117, interaction with a user interface such as a button, touchscreen, and/or graphical user interface.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of effect and utilize signal processing algorithms to generate an appropriate signal to send to haptic output device 118. As a further example, a desired effect may be indicated along with target coordinates for the haptic effect and an appropriate waveform sent to one or more actuators to generate appropriate displacement of the surface (and/or other device components) to provide the haptic effect. Some embodiments may utilize multiple haptic output devices in concert to output a haptic effect.

Figure 1B:
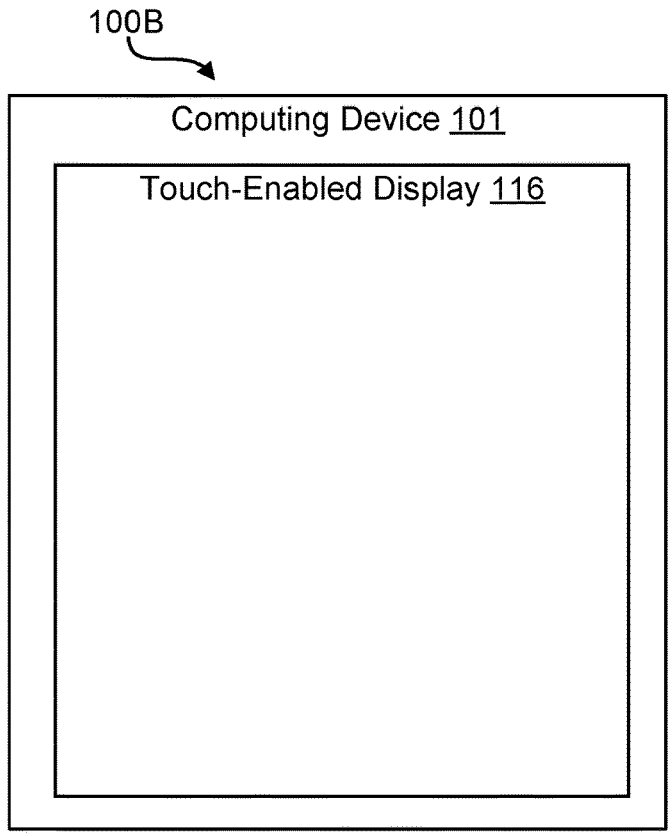
FIG. 1B shows an external view of one embodiment of the system shown in FIG. 1A.

A touch surface may overlay (or otherwise correspond to) a display, depending on the particular configuration of a computing system. In FIG. 1B, an external view of a computing system 100B is shown. Computing device 101 includes a touch enabled display 116 that combines a touch surface and a display of the device. The touch surface 116 may correspond to the display exterior or one or more layers of material above the actual display components.

Figure 1C:
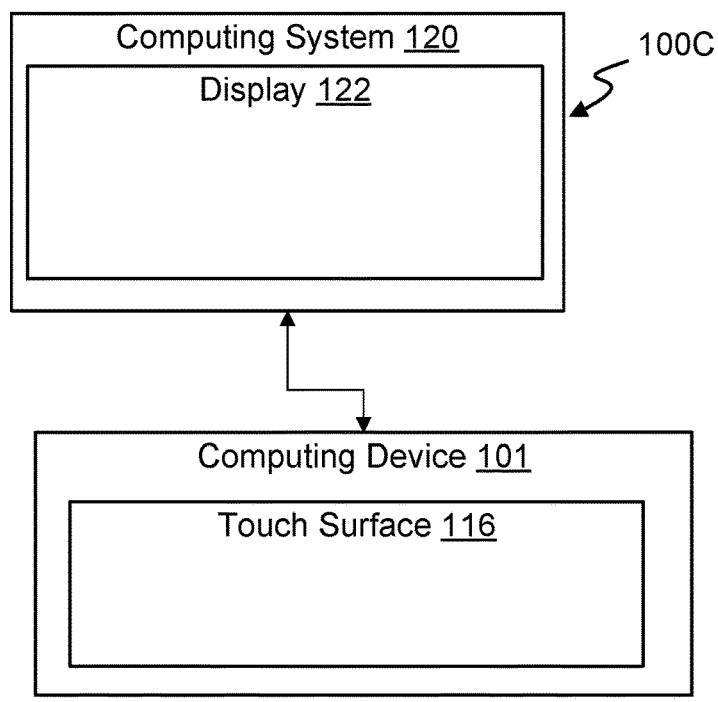
FIG. 1C illustrates an external view of another embodiment of the system shown in FIG. 1A.

FIG. 1C illustrates another example of a touch enabled computing system 100C in which the touch surface does not overlay a display. In this example, a computing device 101 features a touch surface 116 which may be mapped to a graphical user interface provided in a display 122 that is included in computing system 120 interfaced to device 101. For example, computing device 101 may comprise a mouse, trackpad, or other device, while computing system 120 may comprise a desktop or laptop computer, set-top box (e.g., DVD player, DVR, cable television box), or another computing system. As another example, touch surface 116 and display 122 may be disposed in the same device, such as a touch enabled trackpad in a laptop computer featuring display 122. Whether integrated with a display or otherwise, the depiction of planar touch surfaces in the examples herein is not meant to be limiting. Other embodiments include curved or irregular touch enabled surfaces that are further configured to provide haptic effects.

Figure 2A:
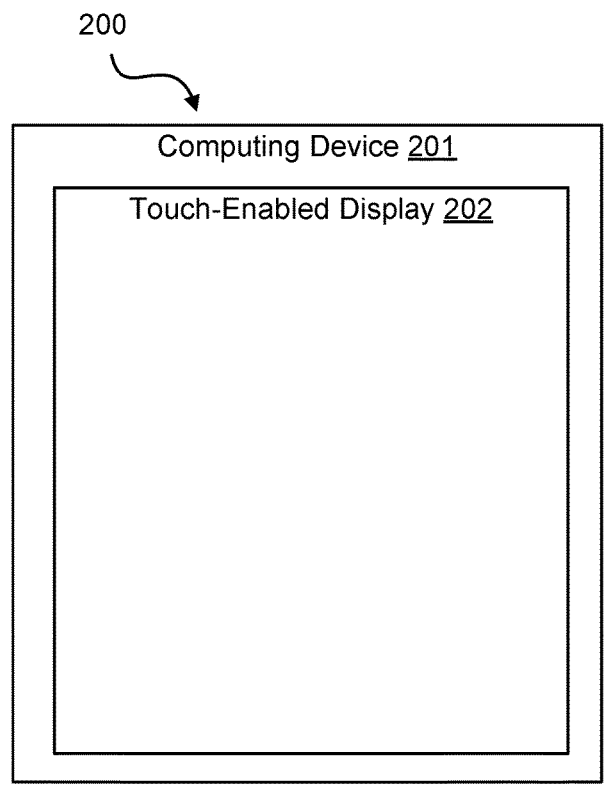
FIG. 2A illustrates an example embodiment for designing haptic effects using speech commands according to one embodiment of the present disclosure.
Figure 2B:
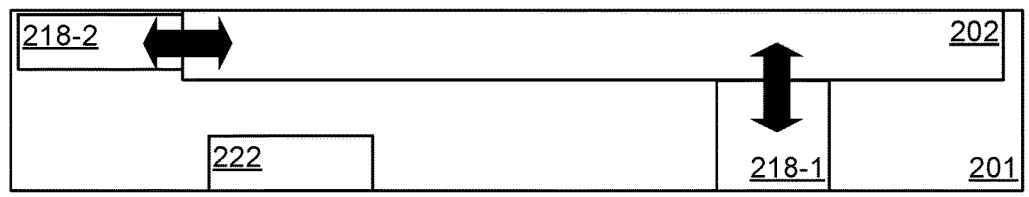
FIG. 2B illustrates another example embodiment for designing haptic effects using speech commands according to one embodiment of the present disclosure.

FIGS. 2A-2B illustrate an example embodiment of a device for designing haptic effects using speech commands. FIG. 2A is a diagram illustrating an external view of a system 200 comprising a computing device 201 that features a touch-enabled display 202. FIG. 2B shows a cross-sectional view of device 201. Device 201 may be configured similarly to device 101 of FIG. 1A, though components such as the processor, memory, sensors, and the like are not shown in this view for purposes of clarity.

As can be seen in FIG. 2B, device 201 features a plurality of haptic output devices 218 and an additional haptic output device 222. Haptic output device 218-1 may comprise an actuator configured to impart vertical force to display 202, while 218-2 may move display 202 laterally. In this example, the haptic output devices 218, 222 are coupled directly to the display, but it should be understood that the haptic output devices 218, 222 could be coupled to another touch surface, such as a layer of material on top of display 202. Furthermore, it should be understood that one or more of haptic output devices 218 or 222 may comprise an electrostatic actuator, as discussed above. Furthermore, haptic output device 222 may be coupled to a housing containing the components of device 201. In the examples of FIGS. 2A-2B, the area of display 202 corresponds to the touch area, though the principles could be applied to a touch surface completely separate from the display.

In one embodiment, haptic output devices 218 each comprise a piezoelectric actuator, while additional haptic output device 222 comprises an eccentric rotating mass motor, a linear resonant actuator, or another piezoelectric actuator. Haptic output device 222 can be configured to provide a vibrotactile haptic effect in response to a haptic signal from the processor. The vibrotactile haptic effect can be utilized in conjunction with surface-based haptic effects and/or for other purposes.

In some embodiments, either or both haptic output devices 218-1 and 218-2 can comprise an actuator other than a piezoelectric actuator. Any of the actuators can comprise a piezoelectric actuator, an electromagnetic actuator, an electroactive polymer, a shape memory alloy, a flexible composite piezo actuator (e.g., an actuator comprising a flexible material), electrostatic, and/or magnetostrictive actuators, for example. Additionally, haptic output device 222 is shown, although multiple other haptic output devices can be coupled to the housing of device 201 and/or haptic output devices 222 may be coupled elsewhere. Device 201 may feature multiple haptic output devices 218-1/218-2 coupled to the touch surface at different locations, as well.

Figure 3A:
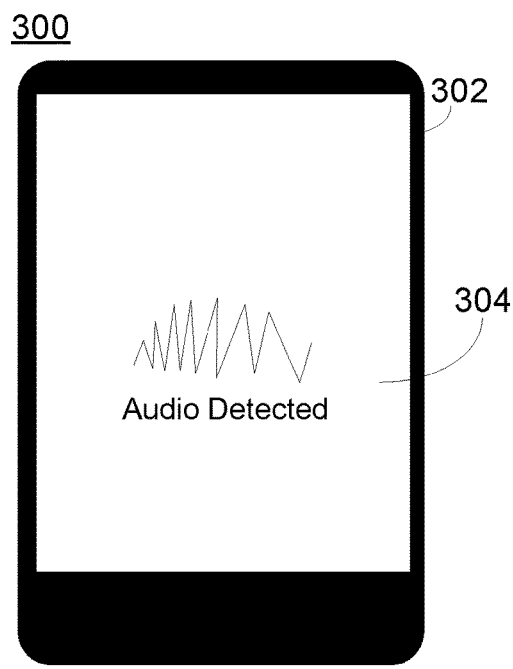
FIG. 3A illustrates another example embodiment for designing haptic effects using speech commands according to one embodiment of the present disclosure.

Turning now to FIG. 3A, FIG. 3A illustrates another example embodiment for designing haptic effects using speech commands according to one embodiment of the present disclosure. FIG. 3A comprises an electronic device 300, which may comprise a smartphone or tablet. The electronic device 300 comprises a touch-screen display 302, and an audio input device. As shown in FIG. 3A, the electronic device 300 has received audio input, and displayed a graphic 304 associated with the audio input. In some embodiments, this graphic 304 may comprise a waive pattern as would be displayed by an oscilloscope measuring the audio signal. Alternatively, the graphic 304 may comprise a preexisting icon used for all haptic effects. Once the audio signal is received, the electronic device 300 is configured to process the audio signal and determine a haptic effect associated with the audio signal.

In one embodiment, the audio input may comprise a description of a specific type of object that the haptic effect should be associated with. For example, the user may tell the electronic device 300 to create a haptic effect related to a specific object or concept (e.g., rain) or action (e.g., man hitting a ball). In such an embodiment, the electronic device 300 will recognize the speech input of the user and then fetch the appropriate effects from a local or remote database given the keywords identified in the user command. As described above, haptic effects in the database may be tagged with keywords or tags, which makes associating effects with data associated with objects or actions fast and efficient.

In another embodiment, the user can provide a high level description of the effect. For example, the user may describe a haptic effect in terms of, e.g., wave shape/rhythm (e.g., ramping up), intensity (e.g., strong), type (e.g., texture), duration (e.g., short) etc. In such an embodiment, the electronic device 300 will recognize the speech input and fetch from a database a haptic effect with the characteristics or tags that the user described. In another embodiment the system recognizes the characteristics and creates a haptic effect or haptic signal that matches the description provided by the user.

In yet another embodiment, the designer describes the haptic effect using sounds mimicking an action. In such an embodiment, the electronic device 300 will capture the sound, e.g., "BOOM," and identify its characteristics, and/or its nature (e.g., explosion). The system 300 then replicates these characteristics in the form of a haptic effect and/or fetches an effect with the appropriate tags or description. In yet another embodiment, the electronic device 300 will capture the sound and search a database for a similar sound and return haptic effects associated with this sound from the database.

Figure 3B:
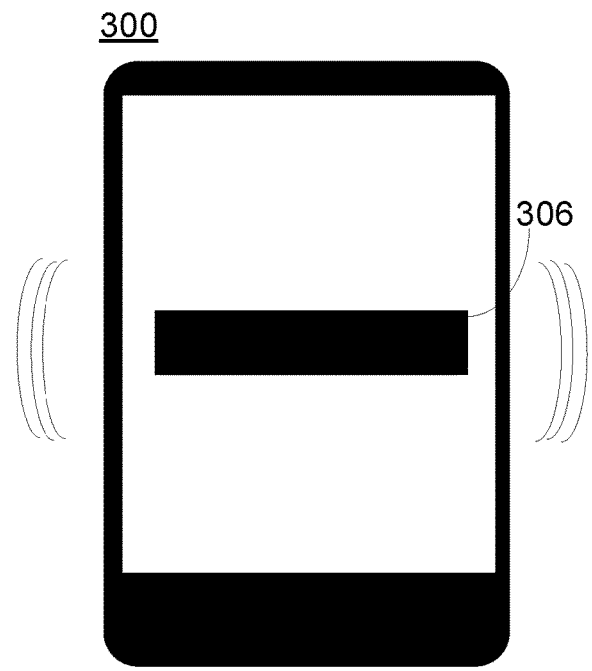
FIG. 3B illustrates another example embodiment for designing haptic effects using speech commands according to one embodiment of the present disclosure.

Turning now to FIG. 3B, FIG. 3B illustrates another example embodiment for designing haptic effects using speech commands according to one embodiment of the present disclosure. As shown in FIG. 3B, the electronic device 300 outputs the haptic effect using one or more haptic output devices. The electronic device then gives the user the option to accept the haptic effect 306. The user may then accept the haptic effect, either using an interface with the electronic device or by using audio input, e.g., speaking a phrase to confirm acceptance of the haptic effect. The language and design shown in system 300 is one example embodiment. Other language to accept a haptic effect may be displayed or used to confirm a acceptance of a haptic effect.

In some embodiments, the user may reject the haptic effect and restart the process of creating the haptic effect. Further, in some embodiments, the user may modify the created haptic effect. For example, the user may modify the created haptic effect using voice commands, e.g., "higher frequency," "lower amplitude," "include hard stop at end," etc. The system 300 is configured to receive this audio input, recognize it, and modify the haptic effect according to the user's description.

Illustrative Methods for Designing Haptic Effects Using Speech Commands

Figure 4:
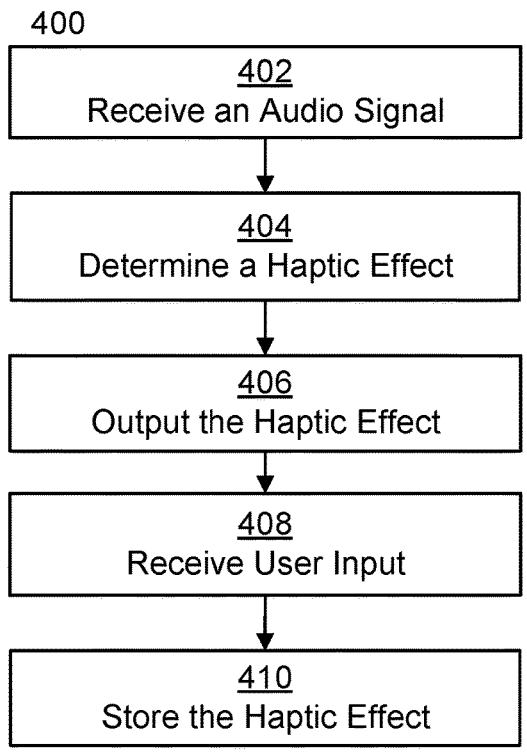
FIG. 4 is a flow chart of method steps for designing haptic effects using speech commands according to one embodiment of the present disclosure.
Figure 5:
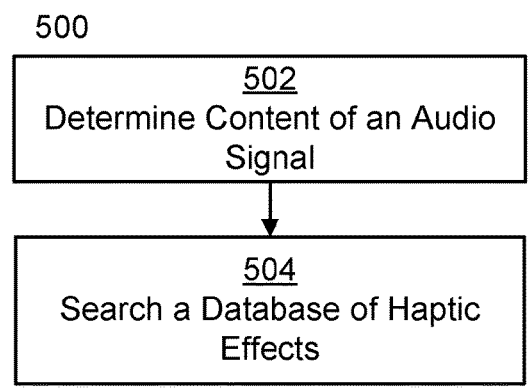
FIG. 5 is a flow chart of method steps for designing haptic effects using speech commands according to one embodiment of the present disclosure.

FIGS. 4 and 5 are flow charts of steps for performing a method for designing haptic effects using speech commands according to one embodiment. In some embodiments, the steps in FIGS. 4 and 5 may be implemented in program code that is executed by a processor, for example, the processor in a general purpose computer, a mobile device, virtual reality control system, or a server. In some embodiments, these steps may be implemented by a group of processors. In some embodiments one or more steps shown in FIG. 4 or 5 may be omitted or performed in a different order. Similarly, in some embodiments, additional steps not shown in FIG. 4 or 5 may also be performed. The steps below are described with reference to components described above with regard to computing device 101 shown in FIG. 1A.

The method 400 begins at step 402 when processor 102 receives an audio signal. The audio signal comprises audible user input, which is detected by audio capture device 117, which then transmits a signal associated with the audible user input to processor 102. The audible user input is associated with a desired haptic effect. For example, the audible user input may describe one or more of: a description of a desired waveform (e.g., speech describing one or more of: a wave shape, a frequency, an intensity, a type (e.g., vibration, friction, deformation, etc.), or a duration), a description of a concept or object associated with the desired haptic effect (e.g., impact, explosion, or rain), or a sound that mimics the desired haptic effect (e.g., BOOM, BANG, etc.). Further, in some embodiments the audible interaction may comprise a mix of the embodiments described above. For example, a user may describe an effect by saying: "provide an explosion effect with BOOM of 200 ms at full magnitude and a 50 Hz frequency."

At step 404 processor 102 determines a haptic effect based on the audio interaction described above. The processor 102 may be configured to determine a haptic effect that matches the vocal user interaction detected at step 402. In some embodiments, the processor 102 may determine a new haptic effect, identify a pre-existing haptic effect (e.g., by searching a database), or determine a modification to a pre-existing haptic effect. Additional steps the processor 102 may take to determine the haptic effect are discussed with regard to method 500 below.

At step 406 processor 102 outputs a haptic signal to haptic output device 118, which outputs the haptic effect. The haptic signal may comprise one or more signals output to one or more haptic output devices 118, which are configured to receive the haptic signal(s) and output a haptic effect that corresponds to the desired haptic effect.

At step 408 the processor 102 receives user input. For example, in some embodiments, the processor 102 may be configured to allow the user to confirm that the determined haptic effect is correct. In such an embodiment, the processor 102 may output a haptic signal to haptic output device 118, which outputs the haptic effect. Then processor 102 may be configured to receive user input confirming that the haptic effect is correct. This user input may comprise vocal user interaction detected by audio input device 117, or it may comprise user interaction via a traditional user interface, e.g., a touchscreen. Further, if the user input indicates that the haptic effect is incorrect, the processor 102 may be configured to modify the haptic effect based on user input. For example, the user may provide input to change one or more characteristics of the haptic effect, e.g., to change the effect's intensity, frequency, duration, duty cycle, or any other characteristic associated with a haptic effect. The processor 102 may be configured to make this change and then output the modified haptic signal to the haptic output device 118.

At step 410 the processor 102 stores the haptic effect. The processor may be configured to store the haptic effect in a local memory 104. Alternatively, the processor 102 may be configured to store the haptic effect in a remote data store and/or a database of haptic effects. Further, in some embodiments, the processor 102 may be configured to apply a tag or other descriptor to the haptic effect. This tag may comprise a higher-level description of the effect (e.g., hard rain, soft collision, ping-pong balls, etc.) or a lower-level description of the haptic effect (e.g., type of effect, frequency, and amplitude). In some embodiments, this tag may enable easier searching for the haptic effect by other devices.

Turning now to FIG. 5, which depicts method 500 of additional steps for determining a haptic effect. The method 500 begins at step 502, when processor 102 determines the content of an audio signal. For example, the processor 102 may be configured to understand spoken-language in the vocal user interaction, e.g., using one or more of Automatic Speech Recognition (ASR) techniques or speech-to-text, such as Hidden Markov Model (HMM), Gaussian Mixture Model (GMM), Deep Learning etc. Further, in another embodiment, rather than extracting full words, the processor 102 may instead be configured to extract only features of the audible input, e.g., low level audio features, Mel-Frequency Cepstrum (MFC), mel-frequency analysis, Zero-Crossing Rate (ZCR), etc. and/or high level features extracted using a pre-trained deep learning network (VGGish, AlexNet, LSTM, RNN, etc.).

At step 504 the processor 102 searches a database to identify a haptic effect. The database may comprise a remote or local database. The database may comprise haptic effects, and the processor 102 may search the database for an appropriate haptic effect matching the vocal user interaction. Alternatively, the database may comprise audio and/or video files comprising associated haptic effects. In such an embodiment, the processor 102 may search the database for a file that corresponds to the vocal user interaction. The processor 102 may then determine that the haptic effect associated with that corresponding file is a matching haptic effect. Further, in some embodiments, the processor 102 may be configured to determine a modification to a haptic effect in the database in order to match the user's description. For example, the processor 102 may identify a haptic effect associated with an explosion in the database. The processor 102 may then modify this haptic effect to match the user's description of a large explosion with a square waive at a 70% duty cycle.

There are numerous advantages of designing haptic effects using speech commands. Embodiments disclosed herein may ease the process for designing haptic effects. For example, a designer may not require specialized knowledge to design haptic effects. Further, embodiments described herein provide for creating and searching a database of existing haptic effects. This may make design and implementing haptic effects more efficient. This may increase the number of devices that include haptic effects. This may lead to a more compelling haptic experience for the user and a more efficient process for the designer.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the present disclosure. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
    a processor configured to:
        receive an audio signal from an audio capture device, the audio signal associated with vocal user interaction, wherein the vocal user interaction comprises sounds mimicking a desired haptic effect;
        determine a haptic effect based in part on the audio signal and associated with the sounds mimicking the desired haptic effect, the haptic effect configured to be output by a haptic output device; and
        store the haptic effect on a data store.

2. The system of claim 1, wherein the vocal user interaction further comprises spoken words, and wherein the processor is further configured to determine a content of the spoken words.

3. The system of claim 2, wherein the content of the spoken words comprises a description of characteristics of a desired haptic effect, and wherein determining the haptic effect further comprises determining a haptic signal with characteristics of the desired haptic effect.

4. The system of claim 3, wherein the characteristics of the desired haptic effect comprise one or more of: a wave shape, a frequency, an intensity, a type, or a duration.

5. The system of claim 2, wherein the content of the spoken words comprises a concept associated with a desired haptic effect, and wherein determining the haptic effect further comprises searching a database comprising data associated with a plurality of haptic effects for a stored haptic effect associated with the concept.

6. The system of claim 1, wherein the processor is further configured to output a haptic signal associated with the haptic effect to the haptic output device.

7. The system of claim 6, wherein the processor is further configured to receive an input signal associated with user interaction confirming the haptic effect prior to storing the haptic effect on the data store.

8. The system of claim 6, wherein the haptic output device comprises one or more of: a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

9. A method comprising:
    receiving an audio signal from an audio capture device, the audio signal associated with vocal user interaction, wherein the vocal user interaction comprises sounds mimicking a desired haptic effect;
    determining a haptic effect based in part on the audio signal and associated with the sounds mimicking the desired haptic effect, the haptic effect configured to be output by a haptic output device; and
    storing the haptic effect on a data store.

10. The method of claim 9, wherein the vocal user interaction further comprises spoken words, and wherein the method further comprises determining a content of the spoken words.

11. The method of claim 10, wherein the content of the spoken words comprises a description of characteristics of a desired haptic effect, and wherein determining the haptic effect further comprises determining a haptic signal with characteristics of the desired haptic effect.

12. The method of claim 11, wherein the characteristics of the desired haptic effect comprise one or more of: a wave shape, a frequency, an intensity, a type, or a duration.

13. The method of claim 10, wherein the content of the spoken words comprises a concept associated with a desired haptic effect, and wherein determining the haptic effect further comprises searching a database comprising data associated with a plurality of haptic effects for a stored haptic effect associated with the concept.

14. The method of claim 9, further comprising outputting a haptic signal associated with the haptic effect to the haptic output device.

15. The method of claim 14, further comprising receiving an input signal associated with user interaction confirming the haptic effect prior to storing the haptic effect on the data store.

16. A non-transitory computer readable medium comprising program code, which when executed by a processor is configured to cause the processor to:
    receive an audio signal from an audio capture device, the audio signal associated with vocal user interaction, wherein the vocal user interaction comprises sounds mimicking a desired haptic effect;
    determine a haptic effect based in part on the audio signal and associated with the sounds mimicking the desired haptic effect, the haptic effect configured to be output by a haptic output device; and
    store the haptic effect on a data store.

17. The non-transitory computer readable medium of claim 16, wherein the vocal user interaction further comprises spoken words, and wherein the processor is further configured to determine a content of the spoken words.

18. The non-transitory computer readable medium of claim 17, wherein the content of the spoken words comprises a description of characteristics of a desired haptic effect, and wherein determining the haptic effect further comprises determining a haptic signal with the characteristics of the desired haptic effect.

19. The system of claim 1, wherein determining the haptic effect comprises receiving a signal associated with a preexisting haptic effect and modifying the signal to match the desired haptic effect.

20. The method of claim 9, wherein determining the haptic effect comprises receiving a signal associated with a preexisting haptic effect and modifying the signal to match the desired haptic effect.

* * * * *